United States Patent
McDaniel

(10) Patent No.: US 8,496,868 B2
(45) Date of Patent: *Jul. 30, 2013

(54) POLYLACTIC ACID SHRINK FILMS AND METHODS OF MANUFACTURING SAME

(75) Inventor: Joseph B. McDaniel, Gahanna, OH (US)

(73) Assignee: Plastic Suppliers, Inc., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/926,712

(22) Filed: Dec. 6, 2010

(65) Prior Publication Data

US 2011/0123763 A1    May 26, 2011

Related U.S. Application Data

(63) Continuation of application No. 11/406,530, filed on Apr. 19, 2006, now Pat. No. 7,846,517, which is a continuation of application No. 60/672,515, filed on Apr. 19, 2005.

(51) Int. Cl.
   *B29C 47/20* (2006.01)
   *B29C 53/10* (2006.01)

(52) U.S. Cl.
   USPC .................. 264/564; 264/567; 264/209.7

(58) Field of Classification Search
   None
   See application file for complete search history.

(56) References Cited

U.S. PATENT DOCUMENTS

| | | | |
|---|---|---|---|
| 2,703,316 A | 3/1955 | Schneider | |
| 3,557,947 A | 1/1971 | Greenwell | |
| 3,910,013 A | 10/1975 | Babineau | |
| 4,255,315 A | 3/1981 | Anspon | |
| 4,333,570 A | 6/1982 | Heider | |
| 4,403,695 A | 9/1983 | Raymoure et al. | |
| 4,463,861 A | 8/1984 | Tsubone et al. | |
| 4,734,304 A | 3/1988 | Tsubone et al. | |
| 5,078,289 A | 1/1992 | Bolton et al. | |
| 5,180,765 A | 1/1993 | Sinclair | |
| 5,230,906 A | 7/1993 | Mueller | |
| 5,424,346 A * | 6/1995 | Sinclair | 524/108 |
| 5,444,113 A | 8/1995 | Sinclair et al. | |

(Continued)

FOREIGN PATENT DOCUMENTS

| | | |
|---|---|---|
| EP | 0 979 722 B1 | 2/2000 |
| EP | 1 038 906 B1 | 9/2000 |

(Continued)

OTHER PUBLICATIONS http://en.wikipedia.org/wiki/Negative_and_non-negative_numbers, pp. 1-9 (printed Jul. 28, 2010).

(Continued)

*Primary Examiner* — Monica Huson
(74) *Attorney, Agent, or Firm* — Gilberto M. Villacorta; Sunit Talapatra; Foley & Lardner LLP

(57) ABSTRACT

A heat-shrinkable polylactic acid (PLA) film and a method of its manufacture are provided. In an exemplary embodiment, the PLA films exhibit heat-induced growth in the cross direction with concomitant shrinkage in the machine direction. The films may comprise any grade of PLA polymer, optionally including additives, such as antiblock, slip, viscosity enhancers and combinations thereof. A method of manufacture is disclosed which includes a post-extrusion temperature conditioning step.

17 Claims, 4 Drawing Sheets

U.S. PATENT DOCUMENTS

| | | | |
|---|---|---|---|
| 5,460,878 A | 10/1995 | Hostetter | |
| 5,466,499 A | 11/1995 | Takagi et al. | |
| 5,502,158 A | 3/1996 | Sinclair et al. | |
| 5,753,326 A | 5/1998 | Blackwelder | |
| 5,756,577 A | 5/1998 | Gutierrez-Villarreal | |
| 5,760,118 A | 6/1998 | Sinclair et al. | |
| 5,766,748 A | 6/1998 | Ikado et al. | |
| 5,788,076 A | 8/1998 | Simmons | |
| 5,834,582 A | 11/1998 | Sinclair et al. | |
| 5,844,066 A | 12/1998 | Kakizawa | |
| 5,849,401 A | 12/1998 | El-Afandi et al. | |
| 5,851,610 A | 12/1998 | Ristey et al. | |
| 6,291,597 B1 | 9/2001 | Gruber et al. | |
| 6,306,969 B1 | 10/2001 | Patel et al. | |
| 6,312,823 B1 | 11/2001 | El-Afandi et al. | |
| 6,350,530 B1 | 2/2002 | Morikawa et al. | |
| 6,607,996 B1 | 8/2003 | Matsunaga et al. | |
| 6,669,771 B2 | 12/2003 | Tokiwa et al. | |
| 6,713,175 B1 | 3/2004 | Terada et al. | |
| 6,756,331 B2 | 6/2004 | Kasemura et al. | |
| 6,811,847 B2 | 11/2004 | Kawashima | |
| 6,815,475 B2 | 11/2004 | Donald et al. | |
| 6,822,136 B1 | 11/2004 | Niemeyer et al. | |
| 6,822,137 B1 | 11/2004 | Dujon et al. | |
| 6,897,260 B2 | 5/2005 | Vynckier | |
| 7,101,935 B2 | 9/2006 | Vynckier | |
| 7,175,917 B2 | 2/2007 | Sukigara et al. | |
| 7,351,785 B2 | 4/2008 | Matsumoto et al. | |
| 7,566,753 B2 | 7/2009 | Randall et al. | |
| 7,615,183 B2 | 11/2009 | Tweed et al. | |
| 7,713,601 B2 | 5/2010 | Tweed et al. | |
| 7,846,517 B2 | 12/2010 | McDaniel | |
| 7,998,545 B2 | 8/2011 | Tweed et al. | |
| 2002/0160201 A1 | 10/2002 | Ohkura et al. | |
| 2002/0192412 A1 | 12/2002 | Satani et al. | |
| 2002/0198332 A1 | 12/2002 | Kasemura et al. | |
| 2003/0119971 A1 | 6/2003 | Donald et al. | |
| 2003/0148688 A1 | 8/2003 | Matsunaga et al. | |
| 2004/0092672 A1 | 5/2004 | Bastioli et al. | |
| 2004/0242786 A1* | 12/2004 | Vynckier | 525/241 |
| 2005/0098928 A1 | 5/2005 | Rosenbaum et al. | |
| 2005/0158492 A1 | 7/2005 | Vynckier | |
| 2005/0177946 A1 | 8/2005 | Riley | |
| 2005/0203208 A1 | 9/2005 | Ruiz | |
| 2006/0045940 A1 | 3/2006 | Tweed et al. | |
| 2007/0054073 A1 | 3/2007 | Tweed et al. | |
| 2008/0050603 A1 | 2/2008 | Randall et al. | |
| 2010/0056689 A1 | 3/2010 | Tweed et al. | |
| 2011/0260355 A1 | 10/2011 | Tweed | |

FOREIGN PATENT DOCUMENTS

| | | |
|---|---|---|
| EP | 1 992 468 A2 | 11/2008 |
| JP | 2003-119367 | 4/2003 |
| JP | 2003-155358 A | 5/2003 |
| JP | 2003-253008 | 9/2003 |
| JP | 2007-216541 | 8/2007 |
| WO | WO-02/072335 A1 | 9/2002 |
| WO | WO-03/016015 A1 | 2/2003 |
| WO | WO-2006/026546 A2 | 3/2006 |
| WO | WO-2006/113795 A2 | 10/2006 |
| WO | WO-2007/061944 A2 | 5/2007 |

OTHER PUBLICATIONS

International Search Report in PCT/US2005/30648 dated Nov. 20, 2006.

International Search Report in PCT/US2006/014723 dated Nov. 23, 2007.

Office Action mailed Aug. 21, 2009 in European Appln No. 05791246.1.

Office Action mailed Mar. 24, 2009 in European Appln No. 06750698.0.

Office Action mailed Sep. 3, 2010 in European Appln No. 05791246.1.

International Search Report in PCT/US2006/44882 dated Aug. 29, 2007.

Mitsubishi Plastics, Inc., "New Business: Biodegradable Plastic Fillm and Sheet," ECOLOJLU, 2004, Web Page, www.mpi.co.jp/english/newbusi/index.htm, 5 pp.

Reubi et al., "Concomitant expression of several peptide receptors in neuroendocrine tumours: molecular basis for in vivo multireceptor tumour targeting", European Journal of Nuclear Medicine and Molecular Imaging (2003), vol. 30, No. 5, pp. 781-793.

Supplementary European Search Report mailed Aug. 4, 2008 in EP 06750698.0.

Supplementary European Search Report mailed Aug. 4, 2008 in EP 05791248.1.

Webster's Ninth New Collegiate Dictionary (1983) p. 1370.

* cited by examiner

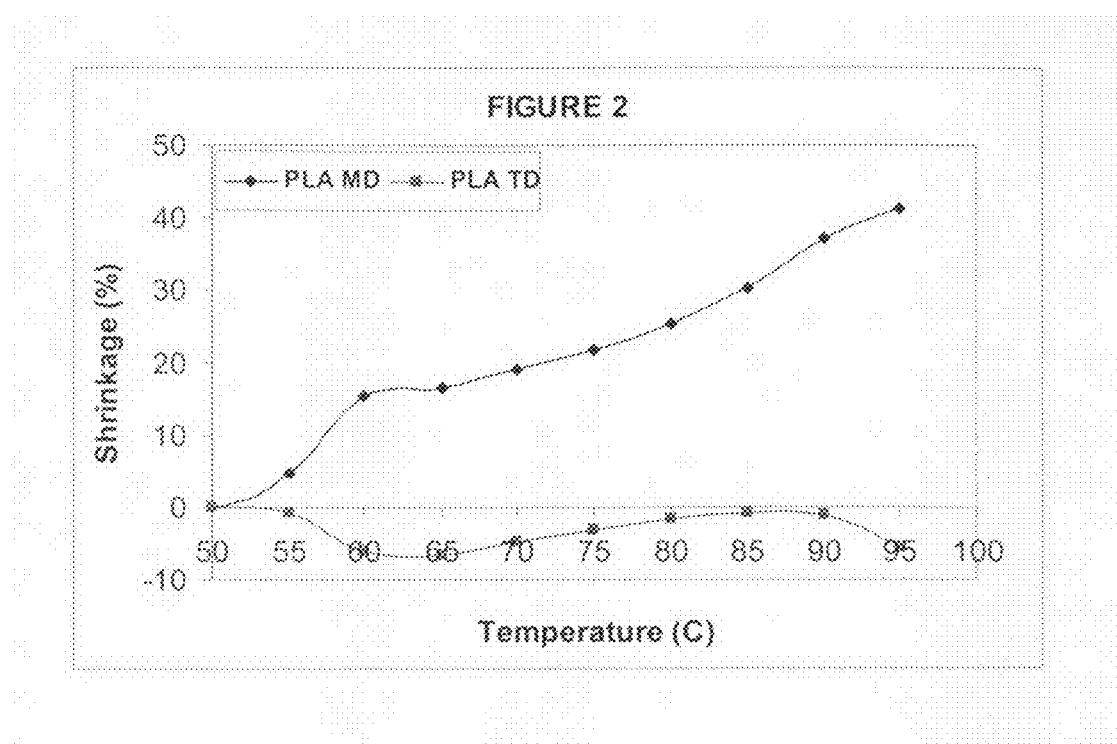

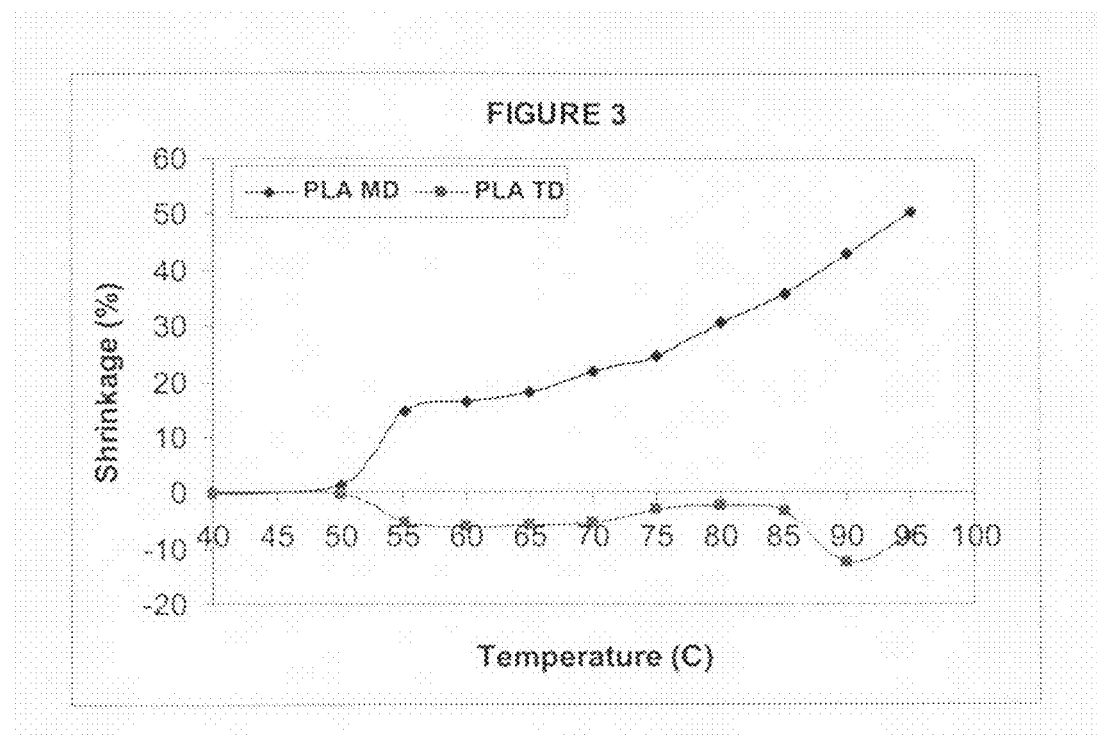

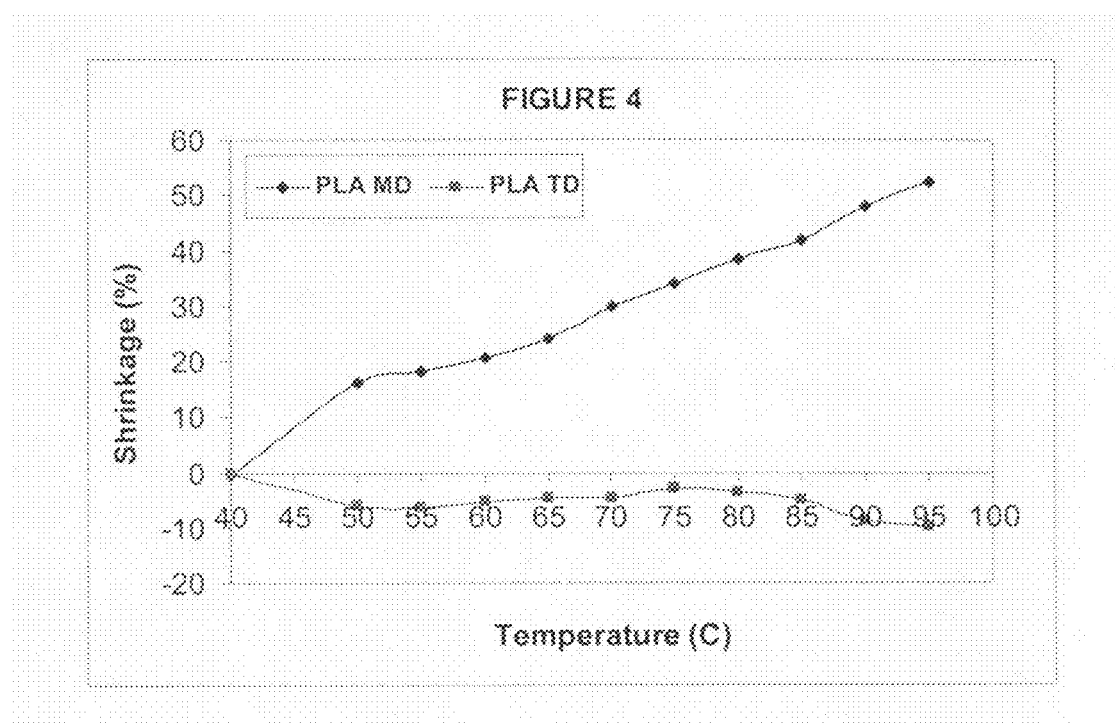

POLYLACTIC ACID SHRINK FILMS AND METHODS OF MANUFACTURING SAME

CROSS-REFERENCE TO RELATED PATENT APPLICATIONS

This application is a continuation application of U.S. patent application Ser. No. 11/406,530, filed Apr. 19, 2006, now U.S. Pat. No. 7,846,517, which claims priority to U.S. provisional patent application No. 60/672,515, filed Apr. 19, 2005, the disclosures of which have been incorporated by reference herein in their entirety.

BACKGROUND OF THE INVENTION

Field of the Invention

The present invention relates generally to heat-shrinkable film. More particularly, the present invention relates to heat-shrinkable polylactic acid films that exhibit temperature dependent shrinkage in one direction with concomitant expansion in another.

Heat-shrinkable films have widely been used for various industrial applications such as, for example, with shrink-wrap films, shrinkable labels and cap seals, by making use of their property of heat-dependent shrinkage. The films have been applied to a variety of surfaces, including plastic and glass surfaces. Shrink films have been manufactured from vinyl chloride resins, polystyrene resins or polyester resins; however, in many instances, film shrinkage is concomitant with undesirable curling of the outer edges of the film. The undesirable curling of the outer edges has limited the application of shrink films. Therefore, there is a need for shrink films that have little to no curling.

As well, interest in compostable polymers, i.e. biopolymers, has greatly increased, and many companies have made efforts to market, for example, packaging materials, hygiene products, sacks, and films with compostable polymers. Polylactic acid (PLA), i.e., polylactide, or condensation polymers which are based on lactic acid, are for many reasons a very attractive group of biopolymers. Their principal degradation product, lactic acid, is a product common in nature, it is not toxic and is used widely in the food and pharmaceutical industries.

While some manufacturers have resorted to manufacturing PLA film with casting methodology (e.g., cast and tenner), the films therefrom have limited applications and are 5 to 10 times more costly than blown film processing. Accordingly, there remains a need for PLA blown films with desirable shrink properties.

SUMMARY OF THE INVENTION

The foregoing needs are met, to an extent, by the present invention, wherein in one aspect shrink film is provided comprised of a PLA polymer blend which, upon exposure to heat, exhibits shrinkage in the length direction and growth in the cross direction. The shrink film may exhibit shrinkage in the length direction in the range of about 10% to about 90% and exhibit a shrinkage in the cross direction in the range of about 0% to about −30% (a negative value indicates growth) when subjected to 95° C. heat for about 10 seconds. In some embodiments, the shrink film may exhibit shrinkage in the length direction of about 50% and exhibit shrinkage in the cross direction of about −5% when subjected to 95° C. heat for about 10 seconds. In other embodiments, the shrink film may exhibit shrinkage in the length direction of about 30% and exhibit a shrinkage in the cross direction of about −5% when subjected to 95° C. heat for about 10 seconds. In still yet other embodiments, the shrink film may exhibit shrinkage in the length direction of up to about 50% or greater and exhibit a shrinkage in the cross direction of up to about −10% when subjected to heat over a temperature range of about 60° C. to about 95° C. after about 10 seconds.

The inventive PLA shrink films may further comprise one or more additives, such as an antiblock additive, a slip additive, a viscosity enhancer or a combination thereof. The antiblock additive may be natural silica, synthetic silica, talc, talc filled magnesium, calcium carbonate, and N,N'-Ethylene Bis (Stearamide) (EBS). The preferred antiblock additive in some embodiments is talc filled magnesium. The slip additive may be oleamide, erucamide, stearamide, behenamide, oleyl palmitamide, stearyl erucamide, ethylene bis-oleamide, EBS, or a combination thereof, and preferably EBS in some embodiments. Viscosity enhancers may include, for example, stabilizers or coupling agents. A preferred coupling agent is CESA®-extend.

The PLA polymer blends of the inventive shrink films disclosed herein may include two or more "grades" of PLA polymer. For example, PLA polymer may comprise about 1 to about 2 percent by weight D-lactide; about 3 to about 5 percent by weight D-lactide; or about 11 to about 13 percent by weight D-lactide. In some embodiments, the shrink films may comprise about 50 weight percent to about 90 weight percent of PLA polymer having about 11 to about 13 percent by weight D-lactide; and about 10 weight percent to about 50 weight percent of a PLA polymer having about 1 to about 2 percent by weight D-lactide. In other embodiments, the shrink films may comprise about 60 weight percent to about 80 weight percent of PLA polymer having about 11 to about 13 percent by weight D-lactide; and about 20 weight percent to about 40 weight percent of a PLA polymer having about 1 to about 2 percent by weight D-lactide. In yet other embodiments, the shrink films may comprise about 65 weight percent to about 75 weight percent of PLA polymer having about 11 to about 13 percent by weight D-lactide; and about 25 weight percent to about 35 weight percent of a PLA polymer having about 1 to about 2 percent by weight D-lactide.

Further, the present invention provides films comprising about 50 weight percent to about 90 weight percent of PLA polymer having about 11 to about 13 percent by weight D-lactide; about 10 weight percent to about 50 weight percent of a PLA polymer having about 1 to about 2 percent by weight D-lactide; less than about 3 percent by weight of an antiblock additive; less than about 1 percent of a slip additive; and less than about 0.5 percent of a viscosity enhancer. The inventive films may also comprise about 50 weight percent to about 90 weight percent of PLA polymer having about 11 to about 13 percent by weight D-lactide; about 10 weight percent to about 50 weight percent of a PLA polymer having about 1 to about 2 percent by weight D-lactide; less than about 2 percent by weight of an antiblock additive; less than about 0.5 percent of a slip additive; and less than about 0.25 percent of a viscosity enhancer. Preferably, in some embodiments, the inventive shrink films comprise about 50 weight percent to about 90 weight percent of PLA polymer having about 11 to about 13 percent by weight D-lactide; about 10 weight percent to about 50 weight percent of a PLA polymer having about 1 to about 2 percent by weight D-lactide; less than about 1 percent by weight of an antiblock additive; less than about 0.25 percent of a slip additive; and less than about 0.1 percent of a viscosity enhancer.

In accordance with another embodiment of the present invention, a packaged good is provided comprising a consumable item and a heat treated film wrapped around at least a portion of the consumable item, which heat treated film is obtained by exposing to heat a shrink film comprised of a PLA polymer blend which exhibits shrinkage in the length direction and growth in the cross direction upon exposure to heat. The packaged good may be a consumable item, including batteries, cans, bottles, disposable lighters, pens and decorative items. The film may form a perforated or non-perforated neck band around the consumable item and may be clear, matte, translucent, or opaque. The packaged good with the heat treated film may include a packaging label and the label may be printed onto the film.

In yet another embodiment of the present invention, a method of making a shrink film comprising (a) providing pellets of PLA, (b) melting the pellets to form a molten mass at a first desired viscosity value or range of values, (c) increasing the viscosity of the molten mass to a second desired viscosity value or range of values, (d) forming a heated bubble from the resulting molten mass, and (e) collapsing the bubble to form a film. The method may optionally include drying the pellets, for example, in a dehumidifying hopper, prior to melting the pellets to form a molten mass.

The melting step may be carried out at a temperature may range from about 325° F. to about 485° F., preferably from about 375° F. to about 425° F., and more preferably at about 400° F. In some embodiments, the first viscosity value ranges from about 1,000 P to about 5,000 P at about 480° F. and an apparent shear rate of about 55 seconds$^{-1}$, preferably from about 2,000 P to about 4,000 P at about 480° F. and an apparent shear rate of about 55 seconds$^{-1}$, and more preferably about 3,000 P at about 480° F. and an apparent shear rate of about 55 seconds$^{-1}$. The second viscosity value may range from about 14,000 P to about 16,000 P at about 375° F. and an apparent shear rate of about 55 seconds$^{-1}$, preferably from about 15,500 P to about 16,500 P at about 375° F. and an apparent shear rate of about 55 seconds$^{-1}$, and more preferably about 15,000 P at about 375° F. and an apparent shear rate of about 55 seconds$^{-1}$. The viscosity increasing step may be carried out in a polymer cooling unit, internal cooling die mandrel, and/or with the addition of chemical viscosity enhancers, the latter being preferably added during or before the melting step. Further, the step of forming a heated bubble may include a stretching step, which orients the film.

In some embodiments of the disclosed invention, the method may further include annealing the film. The annealing step may be carried out at a temperature ranging from about 120° F. to about 285° F., preferably from about 140° F. to about 250° F. The bubble may be heated to a temperature greater than about 100° F.

In another embodiment of the present invention, a method of pretreating a PLA polymer blend to allow the manufacture of a blown film is provided comprising (a) providing pellets of a PLA polymer blend, (b) melting the pellets to form a molten mass at a first desired viscosity value or range of values, and (c) cooling the molten mass to a second desired viscosity value or range of values in a polymer cooling unit. The second desired viscosity value may fall in the range of about two times to about ten times the first desired viscosity value, and preferably in the range of about four times to about eight times the first desired viscosity value.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a graph depicting the percent shrinkage of a 200 Gauge film of the present invention at a given temperature for ten seconds. The diamond data points represent shrinkage in the machine direction (MD) and the square data points represent expansion in the transverse direction (TD).

FIG. 3 is a graph depicting the percent shrinkage of a 200 Gauge film of the present invention at a given temperature for thirty seconds. The diamond data points represent shrinkage in the MD and the square data points represent expansion in the TD.

FIG. 4 is a graph depicting the percent shrinkage of a 200 Gauge film of the present invention at a given temperature for five minutes. The diamond data points represent shrinkage in the MD and the square data points represent expansion in the TD.

DETAILED DESCRIPTION OF THE PREFERRED EMBODIMENTS

Figure 1:
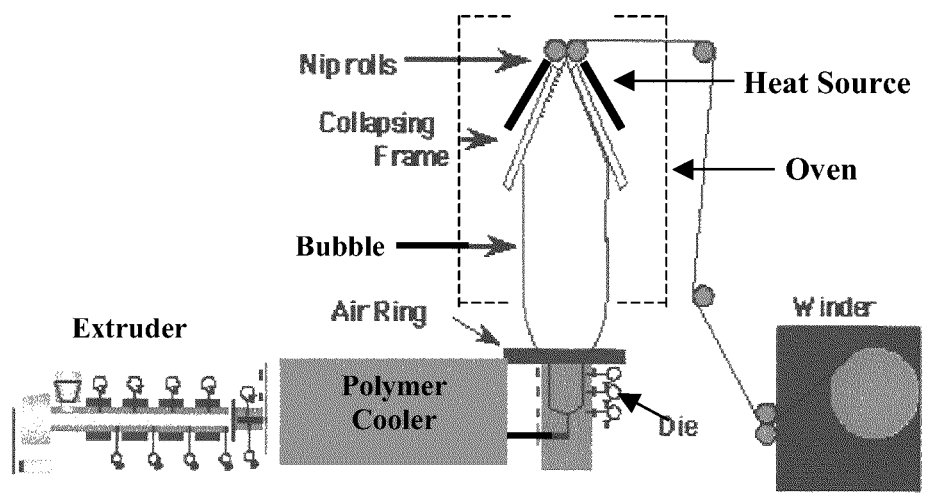
FIG. 1 is a schematic diagram of an assembly for production of PLA blown films in accordance with one embodiment of the instant invention.

In one embodiment of the instant invention, plastic films and a method of their manufacture are described. The polymer films are generated that, when heat treated, shrink in the machine direction and expand in the cross direction. This shrinkage and expansion can occur substantially simultaneously. The machine direction will be defined herein as the "longitudinal" or "length" direction. The "cross direction" or "cross web direction" or "transverse direction" will be defined herein as the direction perpendicular to the machine direction. Embodiments of films described herein exhibit reduced edge-curling characteristics and can be produced in clear, matte, translucent colors and opaque colors. Films of the present invention may be suitable for back side and/or front side printing.

Films of the present invention may comprise various polymers and polymer grades known in the art. Preferably, in some embodiments, polymers are selected that, when used alone or in a blend, enable "memory" to be stored from an orienting process described herein. Many of the determinants for polymer selection are known to one or ordinary skill in the art and/or will be apparent from the teachings herein. For example, where high temperature processing is desired, polymers with higher softening points may be selected, such as, for example, relatively high molecular weight polymers.

Shrink films of the instant invention comprise PLA, and may optionally include additives known in the art, e.g., anti-block additives, slip additives, impact modifiers and "viscosity enhancers." These additives are generally employed to enhance the processing, performance and look of the final product as will be discussed below. In each of the aforementioned classes, various grades of the respective polymers are understood to be included. Each of these classes of polymers and additives will now be discussed, in turn, as relevant to the instant invention.

PLA

Since both lactic acid and lactide can achieve the same repeating unit, the general term polylactic acid as used herein refers to polymers having the repeating unit of formula I without any limitation as to how the polymer was made (e.g., from lactides, lactic acid, or oligomers), and without reference to the degree of polymerization.

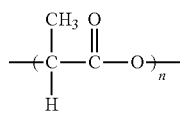

[I]

The polylactide used in the invention may be made from L-, D- or D,L-lactide, or blends thereof, by any polymerization process. A high molecular weight polymer can be produced by ring-opening polymerization from lactic acid dimer, lactide. Lactic acid is optically active, and thus its dimer appears in four different forms: L,L-lactide; D,D-lactide; L,D-lactide ("mesolactide"); and a racemic mixture of L,L- and D,D-lactides. By polymerizing these dimmers either as pure compounds or at different blend proportions, polymers are obtained which have different stereochemical structures affecting their resilience and crystallinity and, consequently, also their mechanical and thermal properties. The obtained polymers are usually hard and optically clear.

Copolymers or polymer blends may also be used in PLA films of the present invention. The weight-average molecular weight (Mw) of polymers suitable to the invention is approximately 10,000-400,000, preferably 40,000-250,000.

Polylactide is in equilibrium with its monomer, lactide. This chemical property can lead to rapid hydrolysis and cause problems of adhesion in the processing of the polymer. Furthermore, the presence of the monomer lowers thermal stability during melt processing. Therefore, residual lactide is typically and preferably removed from the polymer. Preferable monomer content is preferably below about 2%, and more preferably below about 1%.

Heat, during film processing steps, may also contribute to polymer degradation. In addition to the removal of lactide monomer, another way to retard premature hydrolysis of the polymer is to reduce the water content of the polymer to below 500 ppm, and more preferably, to below 200 ppm. Methods to further reduce and/or maintain low water content are described herein below.

PLA is available from multiple suppliers and the polymers and/or polymer blends of the instant invention are not limited to any one grade or supplier thereof. However, NatureWorks® polymers, as supplied by Cargill, Inc. are preferred in some embodiments of the instant invention (e.g., grades 4060D, 4042D, 4032D). While each of grades 4060D, 4042D and 4032D has a molecular weight average 200,000 to about 400,000, they are prepared with differing percentages of D-lactide. Grade 4042D is prepared with about 3 to about 5 weight percent D-lactide. Grade Grade 4060D comprises about 11 to about 13 percent D-lactide; grade 4032D polymer comprises about 1 to about 2 percent D-lactide. These polymers are supplied with a lactide concentration of lower than about 1 percent, a mesolactide level of about 10 percent to about 20 percent, and a moisture level lower than about 500 ppm.

While the instant invention can be suited with any PLA polymer of any grade and composition, the concentration of D-lactide, in particular, can affect the physical properties of the resulting PLA polymer. By way of example, increasing the percent of D-lactide in a polymer or a polymer blend reduces the capacity of the resulting polymer to crystallize, which, in turn, increases undesirable degradation of the polymer at higher temperatures. Said another way, lowering the weight percent of D-lactide in a polymer composition increases the temperature resistance of the polymer and hence the viscosity of the resulting melt at a given temperature as well.

Polymers and/or polymer blends with higher levels of D-lactide can yield films that begin to shrink at lower temperatures when exposed to heat; these films also tend to exhibit more "gentle" shrink curves, i.e., less shrinkage per rise in temperature. Conversely, films comprising polymers with relatively low D-lactide concentration generally require exposure to higher temperatures to shrink. It should also be noted that, typically, PLA polymers with lower concentrations of D-lactide are more expensive than otherwise equivalent polymers having greater D-lactide. Therefore, there can be an economic incentive to maximize the use of PLA with higher levels of D-lactide; however, this incentive should be balanced with the desired physical properties of the films.

Antiblock Additives

Antiblock (also called "antitack") additives serve to improve processing and application of polymer films. Specifically, this class of additives is used to reduce the adhesion between films. Antiblock agents—typically finely divided, solid minerals, but also waxes—act by producing a slight roughening of the surface. Antiblock agents are mainly used in film extrusion and include natural silica, synthetic silica, talc, calcium carbonate, and N,N'-Ethylene Bis(Stearamide) (EBS).

Antiblock additives are typically "loaded" with a carrier compound. While it is by no means a requirement, it is preferable that the carrier polymer be similar to or equivalent to one or all of the polymers in the master PLA blend. In the instant invention, for example, it is preferred that the carrier polymer be a PLA polymer. As the "active ingredient" in an antiblock comprises only a small fraction of the final composition, adding a carrier compound provides ease and consistency in measurements. One of ordinary skill in the art would recognize to take the concentration of filler into account when calculating the final concentration of antiblock in the final product. For example, if a composition comprising 10 percent antiblock consists of 10 percent "active ingredient," the final concentration of the "active ingredient" is 1.0 percent of the total. The values hereinbelow, including those in Table 1, are provided as a percentage of the "active ingredient" in the final formulation.

In the instant invention, the final concentration of antiblock is less than about 3 percent by weight, preferably less than about 2 percent by weight, and more preferably less than about 1 percent by weight. In one embodiment of the present invention, antiblock 2100D from Cargill is preferred. 2100D comprises 10% talc filled magnesium silicate in grade 4032D PLA carrier and has a mean particle size of less than about 1 micron.

In selecting an appropriate antiblock agent, the particle size thereof is one factor to consider. Indeed, the particle size of an antiblock agent can directly contribute to the overall smoothness of the resulting film. That is, all other factors being equal, a smaller antiblock particle size will result in a smoother film. Another factor to consider is the concentration of the antiblock. The concentration of antiblock is preferably minimized particularly, as in some cases, because antiblock additives can introduce haze to the film. Hence, particularly in applications where haze is undesirable (e.g., envelope windows, etc.), the concentration of antiblock may be minimized.

Slip Additives

Slip additives are modifiers that act as an internal lubricant to reduce the coefficient of friction (COF) between two overlapping films, for example, in films rolled after production. Indeed, lower COFs are especially desirable for film applications. These additives migrate to the surface of the plastic during and immediately after processing. That is, a non-visible coating "blooms" to the surface to provide a microscopic "layer" of air between two adjacent sheets of film. In this way, enhanced lubricity and slip characteristics are provided.

Accordingly, slip additives may be considered similar to antiblock additives in that they both serve to lower the COF between two overlapping films. Films of the instant invention may comprise one, both or neither class of additives. Typical slip agents are, for example, oleamide, erucamide, stearamide, behenamide, oleyl palmitamide, stearyl erucamide, ethylene bis-oleamide, EBS, including most grades of their respective refinement. In some embodiments, EBS is a preferred slip agent, and EBS with 4032D carrier is more preferred. EBS is sold under the tradenames Advawax, Lubrol EA, and Micotomic 280.

As with antiblock agents, the "active ingredient" of slip additives is generally supplied with a carrier. Films of the instant invention comprise less than about 1 percent by weight of a slip additive (referring to the "active ingredient" only), and more preferably less than about 0.5 percent by weight. It should be noted that excessive amounts of slip additive may produce films that are excessively smooth, which can compromise the ability of substances (e.g., ink, stickers, etc.) to adhere to the surface. Thus, to enhance, for example, the printing properties of shrink films of the instant invention, the amount of slip additive may require adjustment accordingly.

Viscosity Enhancers

Although numerous methods are known and available to increase the viscosity of polymers during processing of blown films, the term "viscosity enhancer" is defined herein to encompass any chemical agent that increases or maintains the viscosity of a polymer at a given temperature. Viscosity enhancers may be introduced into the polymer blend at any time until the polymer enters the die (discussed below), however, viscosity enhancers are preferably introduced prior to extrusion, and more preferably, during blending of the polymer pellets.

Viscosity enhancers can improve the finished properties of films by preventing and/or reversing the degradation encountered during processing of polymer films. Some viscosity enhancers are "stabilizers." That is, they are used in virgin plastic to either (1) protect against degradation in processing and/or (2) reverse the degradation caused by recycling, and return the plastic to nearly its original performance properties. Another class of viscosity enhancers, "coupling agents," for example, improves the processability of extruded polymer by "coupling" individual polymer strands thereby increasing the melt strength of the plastic.

Viscosity enhancers are generally known and available to one of ordinary skill in the art and have their broadest application with polyesters, polyamides (nylon) and polycarbonates. It is believed that viscosity enhancers have heretofore never been successfully applied to PLA film technology. Though the chemical identity of viscosity enhancers is generally proprietary, the products are available from vendors such as Johnson Polymer LLC (USA) and Clariant International Ltd. (Switzerland). Viscosity enhancers suitable in the instant invention are not limited to those exemplified and/or those with similar mechanisms. In fact, any chemical agent that increases or maintains the viscosity of a polymer at a given temperature may suffice.

In a preferred embodiment of the invention, shrink films are generated comprising a coupling agent for enhancing viscosity. Once such coupling agent, CESA®-extend, is available from Clariant. These viscosity enhancers contain a proprietary copolymer of styrene, methyl methacrylate and glycidyl methacrylate. Without being limited by or bound to theory, CESA®-extend viscosity enhancers are thought to repair the damage (e.g., polymer breakdown) that heat and moisture can cause to PLA resins by coupling individual PLA polymers. In this way, the viscosity enhancer may "extend" polymer chains in the presence of some degradation and thereby attenuate overall loss of molecular weight and viscosity of the polymer melt.

Optimum reactivity of CESA®-extend can be achieved with a preferable use level of less than about 0.5 percent by weight, and preferably less than about 0.25 percent by weight. Again, the "active ingredient" of viscosity enhancers is generally supplied with a carrier. CESA®-extend viscosity enhancers may undergo a process residence time of about 2 to about 20 minutes, depending on starting moisture and/or inherent starting viscosity of the polymer. As well, process residence times are preferably minimized to attenuate polymer degradation from the heat required in the process. A detailed discussion of processing conditions is provided below. In any event, one of ordinary skill in the art would appreciate that it may be necessary to adjust the concentration of any polymer enhancer based, at least, on some of the factors listed above.

In some embodiments, polymers for films may be selected from one, two or each of four groups (i.e., PLA, antiblock and slip additives, viscosity enhancers) and combined to create blended polymer films. Table 1 below provides non-limiting examples of formulations that may be suitable in the preparation of films of the present invention. For clarity in description, a skilled artisan should appreciate from the teachings herein that the percent of additives calculated is only the "active ingredient." In other words, while it should be appreciated that the additives are generally supplied in as a combination of "active ingredient" and carrier, the percent of carrier, if any, has not been listed.

TABLE 1

Polymer Formulations

| No. | 4060D | 4042D | 4032D | Antiblock | Slip | Visc. Enhancer |
|---|---|---|---|---|---|---|
| 1 | 69.58% | 0% | 30% | 0.15% | 0.18% | 0.09% |
| 2 | 97.50% | 0% | 0% | 1.50% | 0.50% | 0.50% |
| 3 | 0% | 0% | 99.58% | 0.15% | 0.18% | 0.09% |
| 4 | 0% | 0% | 97.50% | 1.50% | 0.50% | 0.50% |
| 5 | 0% | 98.58% | 0% | 0.15% | 0.18% | 0.09% |
| 6 | 0% | 98% | 0% | 1.50% | 0.50% | 0.50% |
| 7 | 98.58% | 0% | 0% | 0.15% | 0.18% | 0.09% |
| 8 | 59.58% | 10% | 30% | 0.15% | 0.18% | 0.09% |
| 9 | 49.58% | 20% | 30% | 0.15% | 0.18% | 0.09% |
| 10 | 39.58% | 30% | 30% | 0.15% | 0.18% | 0.09% |
| 11 | 48.61% | 30% | 20% | 1.12% | 0.18% | 0.09% |
| 12 | 48% | 30% | 20% | 1.00% | 0.50% | 0.50% |
| 13 | 30% | 20% | 48% | 1.00% | 0.50% | 0.50% |
| 14 | 30% | 30% | 39.58% | 0.15% | 0.18% | 0.09% |
| 15 | 30% | 0% | 68.85% | 0.15% | 0.50% | 0.50% |
| 16 | 68.85% | 0% | 30% | 0.15% | 0.50% | 0.50% |
| 17 | 0% | 68.85% | 30% | 0.15% | 0.50% | 0.50% |
| 18 | 30% | 68.85% | 0% | 0.15% | 0.50% | 0.50% |
| 19 | 29.58% | 30% | 40% | 0.15% | 0.18% | 0.09% |
| 20 | 70% | 0% | 29% | 0.50% | 0.25% | 0.25% |
| 21 | 29% | 0% | 70% | 0.50% | 0.25% | 0.25% |
| 22 | 99% | 0% | 0% | 0.50% | 0.25% | 0.25% |
| 23 | 0% | 99% | 0% | 0.50% | 0.25% | 0.25% |
| 24 | 0% | 0% | 99% | 0.50% | 0.25% | 0.25% |
| 25 | 100% | 0% | 0% | 0% | 0% | 0% |
| 26 | 0% | 100% | 0% | 0% | 0% | 0% |
| 27 | 0% | 0% | 100% | 0% | 0% | 0% |
| 28 | 0% | 0% | 0% | 100% | 0% | 0% |
| 29 | 99.63% | 0% | 0% | 0.10% | 0.18% | 0.09% |
| 30 | 0% | 99.63% | 0% | 0.10% | 0.18% | 0.09% |
| 31 | 0% | 0% | 99.63% | 0.10% | 0.18% | 0.09% |
| 32 | 99.68% | 0% | 0% | 0.05% | 0.18% | 0.09% |
| 33 | 0% | 99.68% | 0% | 0.05% | 0.18% | 0.09% |
| 34 | 0% | 0% | 99.68% | 0.05% | 0.18% | 0.09% |
| 35 | 30% | 30% | 39.68% | 0.05% | 0.18% | 0.09% |
| 36 | 39.68% | 30% | 30% | 0.05% | 0.18% | 0.09% |
| 37 | 0% | 39.68% | 30% | 0.05% | 0.18% | 0.09% |

The blends in Table 1 may be chosen or prepared to create the "feel" or flexibility of the film to match an end-use application. Where all other processing parameters are equal, the ratio of PLA polymers may be adjusted in accordance with the teachings of the instant invention to provide shrink films with desirable physical properties. For example, reducing the concentration of D-lactide (i.e., increasing weight percent 4032D) yields polymers with a higher softening point and films that require greater temperature to shrink, which moves the shrink curve to the right.

In a preferred embodiment, films are produced with a blend of about 98 weight percent PLA polymer and less than about 2 percent additives by weight and in which the PLA polymer component is about 68 percent 4060D PLA and 30 percent 4032D by weight. Shrink films comprising formulation no. 1 in Table 1 is more preferred.

Impact Modifiers

While practice of the present invention does not require the use of impact modifiers (a.k.a. "plasticizers"), their use may be beneficial in processing. For example, some plasticizers can reduce brittleness. Many plasticizers are known in the art and the present invention is not limited in their use herein. Non-limiting examples include: 1924X, 1901X and 1657G (Kraton® Polymers); Biomax® 4024 and Biomax® 4026 (DuPont®); Nodax™ (Procter & Gamble); P209, P240 and P226 (BioMer, Canada); and Bionelle® 1000 (Showa High-Polymer Co., Ltd.). Typically, the "active ingredient" of an impact modifier is an acrylate polymer, co-polymer or derivatives thereof, (e.g., ethylene acrylate and/or other synthetic or "natural" polymers, commonly referred to as "elastomers." Non-limiting examples of elastomers include butadiene and isoprene polymers, both branched or linear. As with the other additives noted above, plasticizers are generally supplied with a carrier. For example, the plasticizer butadiene may be supplied in polystyrene carrier, and in some instances, the carrier can independently provide plasticizing function.

The net amount of plasticizer (i. e., free of carrier) is preferably less than about by weight 5%, more preferably less than about 4%, and most preferably less than about 3% of the total polymer blend. In some embodiments the amount of plasticizer can range from about 1.5% to about 3.5% by weight. Table 2 below provides non-limiting examples of formulations that may be suitable in the preparation of inventive films comprising plasticizer.

TABLE 2

Polymer Formulations Comprising Plasticizer

Composition (percentage by weight)

| No. | 4060D | 4042D | 4032D | Plasticizer | Antiblock | Slip | Visc. Enhancer |
|---|---|---|---|---|---|---|---|
| 1 | 69.58% | 0% | 28.25% | 1.75% | 0.15% | 0.18% | 0.09% |
| 2 | 69.58% | 0% | 27.5% | 2.5% | 0.15% | 0.18% | 0.09% |
| 3 | 69.58% | 0% | 27% | 3% | 0.15% | 0.18% | 0.09% |
| 4 | 69.58% | 0% | 26.5% | 3.5% | 0.15% | 0.18% | 0.09% |
| 5 | 67.58% | 0% | 30% | 2% | 0.15% | 0.18% | 0.09% |
| 6 | 66.58% | 0% | 30% | 3% | 0.15% | 0.18% | 0.09% |
| 7 | 59.58% | 8% | 30% | 2% | 0.15% | 0.18% | 0.09% |
| 8 | 59.58% | 7% | 30% | 3% | 0.15% | 0.18% | 0.09% |
| 9 | 68.85% | 0% | 27.5% | 2.5% | 0.15% | 0.50% | 0.50% |
| 10 | 68.85% | 0% | 26.5% | 3.5% | 0.15% | 0.50% | 0.50% |
| 11 | 29% | 0% | 68% | 2% | 0.50% | 0.25% | 0.25% |
| 12 | 29% | 0% | 67% | 3% | 0.50% | 0.25% | 0.25% |

Processing

After the polymer composition of the film is selected, the polymer is then processed to generate a film with desirable shrink properties. Generally, the polymers are procured in pellets or grains. In cases where multiple polymers are to be included, the polymers pellets are first dry blended. That is, the pellets are mixed together. In a preferred embodiment of the invention, the pellets are then processed into film by blown film technology. PLA blown films and methods of manufacturing same are described in U.S. Provisional Patent Application Nos. 60/605,151 and 60/609,827 filed Aug. 30, 2004 and Sep. 15, 2004, respectively, the disclosures of which are incorporated herein in their entirety by reference.

Blown film processing can be characterized in five steps: extrusion, temperature conditioning, orienting, collapsing. A preliminary step of drying the polymer pellets is preferable, but not required. As well, a terminal step of annealing may be preferable, but not required according to the instant teachings. An assembly for each processing step is generally depicted in FIG. 1 and will now be described in detail.

Drying

PLA polymers are generally supplied in sealed bags from the manufacturer and in relatively dry condition. Typically, the moisture content of these as-supplied PLA polymers is less than about 500 ppm and preferably less than about 200 ppm. Where the moisture level is deemed desirable, no further drying may be necessary or required. However, PLA readily absorbs moisture from the atmosphere and therefore, the blended polymer pellets are optionally and preferably first dried by heating in a dryer to remove surface moisture. Without being bound by or limited to theory, it is believed that the removal of moisture content may help control the relative viscosity loss due to hydrolysis. As mentioned above, higher temperatures and the presence of even a small amount of moisture can hydrolyze PLA in the ensuing melt phase.

PLA is generally produced by a reversible condensation reaction, which produces water; when undried PLA is heated, hydrolysis can occur and key mechanical properties of the PLA may be compromised. For example, the viscosity of the polymer, when melted, is inversely proportional to the percentage of free monomer therein. Therefore, in an attempt to minimize batch-to-batch variation in viscosity, preferably, significant moisture is removed from the polymer pellets. In some embodiments, a moisture content of less than about 200 ppm is preferable, and less than about 50 ppm, more preferable (measured by the Karl Fisher method).

A dehumidifying hopper with hot air at a relatively low dew point may be used; however, a variety of air dryers are known in the art and many of them may be suitable for drying. The present invention need not be limited to air dryers only, but may include other types of dryers, including baking ovens. A dehumidifying hopper may be desirable in some embodiments in that dehumidified air passes through a bed of PLA to extract moisture from the resin. A desiccant material, such as silica, absorbs moisture from the circulating air. Dual desiccant bed systems are common, so that one bed is onstream while a stand-by bed is being regenerated. Either a time-cycle or a predetermined decrease in air dew point is used to shift airflow from one bed to the other. Such methodology is thought to be effective in removing some moisture that may reside below the surface of the polymer pellets in addition to the surface moisture.

Preferable dryers of the instant invention for drying PLA may have one or more of the following characteristics:
1. Desiccant beds capable of achieving a dew point of about −40° C. in the supply air
2. A means, e.g., an after-cooling unit, to eliminate or reduce the likelihood of a temperature spike in the supply air
3. Superior temperature control in the PLA drying range The temperature and duration of drying may be dependent on the total amount and condition of the polymer(s) (i.e., the amount of starting surface moisture), and may need to be adjusted on a batch-by-batch basis. Preferably, the polymers experience little to no melting in this step. By way of example, typical drying conditions require that temperatures range from about 110° F. to about 230° F., and preferably from about 130° F. to about 190° F. for variable periods of time. By way of specific example, the residence time for drying polymer with air (dew point, −40° F.) at a flow rate of greater than about 0.5 ft3/min. requires about 4 hours at about 110° F. and about 2 hours at about 190° F. Higher drying temperatures may lead to softening and blocking of polymer, while lower drying temperatures can result in extended drying times and/or incomplete drying.

Dew point is an absolute measure of air moisture and is independent of air temperature. Dew point may be used to control dryer performance. Airflow is another component to drying, as it heats the resin and absorbs its moisture. Sufficient airflow can maintain the resin at the proper temperature for its entire residence time. In embodiments were additional colorants, additives, or otherwise ingredients are used, it may be preferable to minimize moisture-related degradation by further drying same.

Extrusion

Extrusion is whereby the pellets are melted into a low viscosity molten mass, thus combining the heretofore individual polymer beads or grains into one molten mass. The viscosity of the melt will depend on the temperature. Temperatures can range from about the temperature at which the polymers will remain melted to about the temperature where degradation of the polymers begins to occur. By way of example, extrusion melt temperatures may be maintained between about 325° F. to about 485° F. for certain PLA polymer blends, but may ultimately depend on the different polymers that have been blended and their respective melting points. In some embodiments, about 400° F., is preferred.

By way of example, the viscosity of PLA at about 480° F. and an apparent sheer rate of about 5.5 seconds$^{-1}$ in a capillary rheometer may range from about 1,000 poise (P, dyne/cm$^2$) to about 8,000 P, preferably about 3,000 P to about 6,000 P, and more preferably, about 4,500 P. At a shear rate of about 55 seconds$^{-1}$, the same polymer at about 480° F. may have an apparent viscosity that ranges from about 1,000 P to about 5,000 P, preferably about 2,000 P to about 4,000 P, and more preferably, about 3,000 P.

Temperature Conditioning

Temperature conditioning is done to increase the viscosity of the molten polymers, which makes the melt manageable for further processing. Indeed, it should be noted that one significant aspect of the instant invention provides a method of changing the viscosity of the polymer melt upon extrusion and before orientation (i.e., before the polymer exits the die). While the cooling step may be accomplished by a variety of methods known in the art, the use of a polymer cooler is one means to this end. The viscosity of the polymer melt may also be adjusted, alone or in combination for example, by air cooling the die inner mandrel through which the polymer film is blown, the use of viscosity enhancers noted above, and combinations of these techniques.

The use of a polymer cooler at this step in processing may enable more precise temperature control than by air cooling the die alone. It is believed that temperature control over the orienting process which follows the cooling step allows for shrink memory to be stored in the film.

A variety of coolers are known in the art and may be used by one of ordinary skill in the art based on the teaching provided herein. However, a Koch Engineering SMR polymer cooling unit, available from Sulzer Chemtech, USA of Tulsa, Okla., adapted for PLA use may be preferred in some applications. By "adapted," it is meant that a polymer cooler may have to be adjusted for a cooling capacity lower than that for polystyrene, for example. In other terms, the pressure in the primary loop for polystyrene cooling is generally about 1000 psi to about 7,000 psi and, in some instances, about 5,000 psi; by contrast, the pressure in the same loop adjusted for PLA use may range from about 300 psi to about 4,000 psi.

The polymer cooler operating temperature range is preferably between about 280° F. to about 450° F. Higher temperatures may be used, but such higher temperatures may also contribute to degradation of the polymer. The temperature and duration of cooling can again depend on both the amount of polymer being cooled and the film properties that may be desired. In one example, the viscosity of PLA at 375° F. and an apparent sheer rate of about 5.5 seconds$^{-1}$ in a capillary remoter, may range from about 15,000 P to about 17,000 P, preferably about 15,500 P to about 16,500 P, and more preferably, about 16,000 P. At a shear rate of about 55 seconds$^{-1}$, the same polymer at 375° F. may have an apparent viscosity that ranges from about 14,000 P to about 16,000 P, preferably about 16,500 P to about 15,500 P, and more preferably, about 15,000 P. It will be apparent from the data presented herein that the polymer cooling step can increase the viscosity from about 2 to about 10 times that of the polymer coming out of the extruder. In other embodiments, the viscosity may be increased about 5 to about 9 times.

The polymers demonstrate a substantial increase in viscosity upon cooling in the polymer cooler, which cooling procedure, in part, is thought to allow for subsequent blowing of the film. It is also apparent that the viscosity of the PLA polymers exhibits a consistent shear viscosity of a relatively large range of shear rates at any given temperature.

Orienting

The next step in preparation of films of the present invention is orienting, also known as stretching. This step imparts the shrink "memory" into the film where it is "stored" by the polymer blend. Orienting can be accomplished by many methods and associated equipment known to one of ordinary skill in the art, including, for example, machine/cross direction orientation and blown film orientation. All methods are preferably designed to first control the temperature of the polymer, followed by a controlled stretching operation. Without being limited to or bound by theory, it is believed that the orienting process conveys strength and flexibility to the film product. Furthermore, though orientation bubbles may be pulled both up or down (i.e., vertically) or horizontally through a die, it may be preferable to pull said bubble upward to facilitate control and maintenance of the polymer temperature during orientation.

In a preferred embodiment of the present invention, the polymer melt is already pre-cooled, preferably in a polymer cooler, and then submitted to a blown film orientation process. The process of the present invention has at least one significant advantage in that a very controlled temperature—from the post extrusion temperature conditioning—can be achieved prior to the formation of a bubble. A blown film extrusion process extrudes molten plastic polymer through a die of circular cross-section and uses an air jet to inflate a bubble comprising same.

In the preferred embodiment then, by virtue of pre-cooling the melted polymer, only a final fine tuning of orienting temperature is performed, where desired, during the orientation process. In other words, the greater share of temperature conditioning takes place prior to orienting and not during orienting. Where a fine tuning of temperature is desired, it can be relatively easily accomplished by a temperature controlled air ring, which blows chilled air at the base of the bubble.

Die parameters may range from 1:0.75 BUR (Blown Up Ratio) to about 1:2.0 BUR, and preferably, about 1:1.4 BUR in the cross web direction. In the length direction, die parameters may range from about 1:1 draw down ratio to about 1:300 draw down ratio, and preferably, about 1:190 draw down ratio. Orienting temperatures of the present invention range from about 100° F. to about 180° F., and more preferably, about 140° F.

Collapsing

Once the extrudate has been inflated into a circular bubble, it then is "collapsed" into a double thickness film. The collapsing process is performed by use of an "A-frame," also known as a collapsing frame. This frame uses rollers, panels, and/or flat sticks to flatten the bubble into a sheet of double-thickness film (FIG. 1). The sheets are ultimately cut and wound onto two finished rolls, or coils, of PLA film. The sheets of film can also be cut to desired length.

In accordance with another teaching of the present invention, it has also been learned that control of the film temperature while in bubble form may prevent the formation of undesirable wrinkles and/or film layers that stick together upon passage through the collapsing nip rollers. By control, it is meant that the temperature of the polymer bubble is preferably maintained at a temperature greater than about 100° F., more preferably the temperature is maintained at a range from about 100° F. to about 200° F., and even more preferably, from about 120° F. to about 140° F.

The temperature of the polymer bubble may be regulated by a variety of methods. In one embodiment, it has been found that it may be beneficial to include a heated oven (FIG. 1) enclosure constructed around the collapsing frame—and generally extending around a portion of the bubble—to control the temperature at which the bubble is collapsed. The oven enclosure may optionally extend to and be sealed at or near the top of the bubble to better maintain insulation and temperature control. The "oven" may generally comprise any device that prevents the polymer bubble from cooling below a predetermined temperature, and may include both heated panels and/or insulation alone. In a preferred embodiment, the oven comprises a heat source preferably located at or near the top of the collapsing frame. The heat generated therefrom is then maintained and circulated within the oven by virtue of insulation encompassing the bubble.

In yet another embodiment, the temperature of the polymer bubble can be regulated by means of internal circulation of warm (e.g., about 150° F.) air through said bubble. Of course, it should be understood that a heated oven may be used in conjunction with any means for internal circulation of warm air.

Annealing

Annealing, also called crystallization or relaxation, is typically the final step in the preparation of films of the instant invention. According to the teachings herein, an annealing step is optional. When desired, annealing is generally accomplished post-orienting, and performed at temperatures between about 120° F. to about 285° F. in some embodiments. This process is accomplished by rotating heated cylinders that contact the film just prior to the winding process where the finished roll of plastic film is generated.

Film properties using the aforementioned protocol can be manipulated as desired with nominal trial and error by one of ordinary skill in the art. Such variations are expected and are incorporated into the scope of the invention. Films of the instant invention can generally have characteristics that fall into the following ranges:

Film Shrinkage at about 95° C. for about 10 seconds:

Longitudinal direction: about 10% to about 90%, with an average of about 50%.

Cross direction: about 0% to about −30% (growth), with an average of about −5%.

In one embodiment of the instant invention, percent shrinkage as a function of temperature was studied with, for example, 200 gauge (0.002 in.) film subjected to 10 second, 30 second, and 5 minutes exposure to heat (see FIGS. 2, 3 and 4, respectively). The films tested herein were prepared from a blend of about 68.53% grade 4060D PLA, about 30% grade 4032D PLA, about 1.2% grade 2100D antiblock of which 10% is "active ingredient," about 0.18% slip EBS and about 0.09% polymer resin chain extender CESA®-extend. (The term "about" has been used herein and throughout this specification to account for the customary variations in measurements common and expected by one of ordinary skill practicing this art.) Using the preferred process described above, the polymer blend, without additional drying, was extruded at about 390° F., and cooled in a polymer cooler to below about 375° F. The cooled polymer was subsequently blown film oriented between about 120° F. and 140° F. and finally annealed at about 195° F. Die ratios were 1:1.4 in the cross web direction and 1:190 in the machine direction.

The respective films were placed in a hot water bath at the temperature shown for the indicated times, and the shrinkage in the machine direction (MD) and the transverse direction (TD) as a percentage of the original dimensions was plotted. While the shrink films studied in this example were subjected to heated water, exposure to heat in any form (e.g., heated air from a hot air dryer) may induce shrinkage of the inventive films. As is evident from the results, the films described exhibit positive shrinkage in the MD and negative shrinkage (i.e., growth or expansion) in the TD at all the temperatures tested.

This growth in the cross direction can prevent the label from curling back on the edges during the shrinking process. Accordingly, in one embodiment, films of the present invention may have application in roll-to-roll (i.e., wrap around) labeling of various shaped cylinders and cones such as, for example, batteries, cans, bottles, disposable lighters, pens, floral wraps and other decorative items. However, the scope of applications should not be limited to the aforementioned consumer products or uses.

Films of the present invention have innumerable other applications. For example, these films can also be used in printed/unprinted application for holding together twin packs, attachments, neck bands, and perforated neck bands for decoration or tamper evident use, to name a few options.

The many features and advantages of the invention are apparent from the detailed specification, and thus, it is intended by the appended claims to cover all such features and advantages of the invention, which fall within the spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, fall within the scope of the invention.

What is claimed is:

1. A method of making a blown PLA shrink film comprising 97.5 to 100 percent, by weight, polylactic acid polymer blend, which film, upon exposure to 95° C. heat for 10 seconds, exhibits shrinkage in the length direction and negative shrinkage (a negative value indicates growth) in the cross direction relative to the original dimensions of the shrink film, the method comprising (a) providing dry pellets of PLA, (b) melting the pellets to form a molten mass at a first desired viscosity value ranging from about 1,000 P to about 5,000 P at about 480° F. at an apparent shear rate of about 55 seconds$^{-1}$, (c) increasing the viscosity of the molten mass to a second desired viscosity value or range of values, (d) forming a bubble from the resulting molten mass at a blown up ratio ranging from 1:0.75 to 1.2.0, and (e) collapsing the bubble to form a film.

2. The method of claim 1, in which the melting step is carried out at a temperature range of about 325° F. to about 485° F.

3. The method of claim 1, in which the melting step is carried out at a temperature range of about 375° F. to about 425° F.

4. The method of claim 1, in which the first viscosity value ranges from about 2,000 P to about 4,000 P at about 480° F. at an apparent shear rate of about 55 seconds$^{-1}$.

5. The method of claim 1, wherein the bubble is formed at a draw down ratio ranging from 1:1 to 1:300.

6. A method of making a blown polylactic acid (PLA) shrink film comprising 97.5 to 100 percent, by weight, polylactic acid polymer blend, which film, upon exposure to 95° C. heat for 10 seconds, exhibits shrinkage in the length direction and negative shrinkage (a negative value indicates growth) in the cross direction relative to the original dimensions of the shrink film, the method comprising (a) obtaining dry pellets of PLA, (b) melting the pellets to form a molten mass at a first desired viscosity value or range of values, (c) increasing the viscosity of the molten mass to a second desired viscosity value ranging from about 14,000 P to about 16,000 P at about 375° F. at an apparent shear rate of about 55 seconds$^{-1}$, (d) forming a bubble from the resulting molten mass at a blown up ratio ranging from 1:0.75 to 1:2.0, and (e) collapsing the bubble to form a film.

7. The method of claim 6, wherein the bubble is formed at a draw down ratio ranging from 1:1 to 1:300.

8. The method of claim 6, in which the second viscosity value ranges from about 15,500 P to about 16,000 P at about 375° F. at an apparent shear rate of about 55 seconds$^{-1}$.

9. The method of claim 6, in which the viscosity increasing step is carried out in a polymer cooling unit.

10. A method of making a blown polylactic acid (PLA) shrink film comprising 97.5 to 100 percent, by weight, polylactic acid polymer blend, which film, upon exposure to 95° C. heat for 10 seconds, exhibits shrinkage in the length direction and negative shrinkage (a negative value indicates growth) in the cross direction relative to the original dimensions of the shrink film, the method comprising (a) obtaining pellets of a PLA polymer blend, (b) melting the pellets to form a molten mass at a first desired viscosity value ranging from about 1,000 P to about 5,000 P at about 480° F. at an apparent shear rate of about 55 seconds$^{-1}$, (c) increasing the viscosity of the molten mass to a second desired viscosity value ranging from about 14,000 P to about 16,000 P at about 375° F. at an apparent shear rate of about 55 seconds$^{-1}$, (d) forming a bubble from the resulting molten mass at a blown up ratio ranging from 1:0.75 to 1:2.0, and (e) collapsing the bubble to form a film.

11. The method of claim 10, wherein the bubble is formed at a draw down ratio ranging from 1:1 to 1:300.

12. The method of claim 10, in which the step of forming a bubble includes a stretching step, which orients the film.

13. The method of claim 12, in which the stretching step is carried out using a blown film orientation process.

14. The method of claim 10, further comprising annealing the film.

15. The method claim 14, in which the annealing step is carried out at a temperature ranging from about 120° F. to about 285° F.

16. The method of claim 15, in which the annealing step is carried out at a temperature ranging from about 140° F. to about 250° F.

17. The method of claim 10, in which the viscosity increasing step is carried out in a polymer cooling unit.

* * * * *

UNITED STATES PATENT AND TRADEMARK OFFICE
CERTIFICATE OF CORRECTION

PATENT NO. : 8,496,868 B2  
APPLICATION NO. : 12/926712  
DATED : July 30, 2013  
INVENTOR(S) : Joseph B. McDaniel Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

On the Title Page:

The Related US Application Data Item (63) section should read:

Related U.S. Application Data

Item (63) Continuation of application No. 11/406,530, filed on Apr. 19, 2006, now Pat. No. 7,846,517.

Item (60) Provisional application No. 60/672,515, filed on Apr. 19, 2005.

Signed and Sealed this  
Twenty-second Day of April, 2014

Michelle K. Lee  
*Deputy Director of the United States Patent and Trademark Office*